SYSTEM FOR THE RADIO-TRANSMISSION OF INFORMATION

Filed Feb. 8, 1956

INVENTOR
GASTON ADELIN MATHIEU
BY
AGENT

United States Patent Office 2,935,605
Patented May 3, 1960

2,935,605

SYSTEM FOR THE RADIO-TRANSMISSION OF INFORMATION

Gaston Adelin Mathieu, Hamburg, Germany, assignor, by mesne assignments, to North American Philips Company, Inc., New York, N.Y., a corporation of Delaware Application February 8, 1956, Serial No. 564,297

Claims priority, application Germany February 9, 1955

2 Claims. (Cl. 250—13)

This invention relates to systems for the radio-transmission of information between a main station which can be connected, if desired, to a telephone system and a substation, preferably mobile, in mutual speech communication, during which alternate talking only is possible, the handset having a talking key which must be pushed during the call. Such systems are substantially intended for local radio-communication, in docks and similar local services, in which phone calls between any arbitrary vehicle and a fixed main station are possible and, in addition, the mobile subscriber may be connected, if desired, to any arbitrary subscriber of a telephone system.

As a rule, systems of this kind are fundamentally built up in such manner that the mobile transmitting and receiving equipment is connected via a hybrid to a common aerial, the fixed station being of a similar design in this respect. The two stations need different carrier frequencies for their mutual communication. However, the handset in the vehicle station is connected via a four-wire line to the transmitter and the receiver of the station, whereas in the fixed station use can be made only of a two-wire handset, since there must be a possibility of connecting to the telephone system, which utilizes only a two-wire line for talking and listening. Consequently, for connecting the two-wire handset and the two-wire line of the telephone system to the transmitter and receiver of the main station, use is commonly made of a four-wire termination which, as is well-known, comprises a bridge circuit or a transformer of corresponding design, the impedance of the line wire being neutralized by a balancing impedance connected to the corresponding points of the bridge circuit or the transformer.

However, the following disadvantage is then involved:

In a radio-communication equipment of the above-mentioned kind, the balancing impedance can difficultly be matched to the line with the required accuracy and it has thus been found in practice that certain crosstalk still occurs between the output of the receiver and the modulator output of the transmitter, the carrier wave of the transmitter having modulated on it, though weakly, the low-frequency signal and the noise of the receiver.

It is also possible, at least in the vehicle station, to do without a hybrid connecting the aerial to the transmitter and the receiver and nevertheless to work only one aerial, since it is possible to employ a relay connecting the aerial at will to the transmitter or the receiver by means of a change-over contact, the relay being controlled by a talking key which is incorporated in the handset and pushed by the subscriber of the vehicle during talking. This possibility is frequently utilized to make the transmitter operative only during the call, since a considerable saving of energy (which is important more particularly in vehicle stations) is thus obtained. Furthermore in this case it is possible to dispense with a hybrid, which constitutes a comparatively expensive component part of the station.

Furthermore, it is to be considered as disadvantageous that these known methods and devices require the use of two different carrier-wave frequencies, one intended for the traffic between the mobile station and the fixed station and the other for the opposite traffic. As is well known the number of frequencies available is very limited and furthermore it is necessary to make allowance for the requirement that the frequency distance once laid down between the two carrier-wave frequencies must be maintained with high accuracy.

The object of the invention is to provide a system which utilizes only one carrier-wave frequency for the traffic between the two stations and which furthermore does not necessarily require a four wire termination for connecting the two-wire handset and the two-wire line of the telephone system to the devices of the fixed station.

According to the invention, this task is fulfilled in that both stations operate on the same carrier-wave frequency, each station being provided with an aerial common for transmitting and receiving which aerial in the rest position is connected to the receiver input and whereby the aerial of the substation is switched over to the transmitter output by means of a talking key in the handset, when said key is pushed, but the aerial of the main station is connected to the transmitter output by means of a speech-controlled switch, known per se, which is actuated by outgoing speech, and that the two-wire handset of the main station or the two-wire line of the through-connected telephone system, which in the rest condition is connected to the modulator input of the transmitter, is switched over to the receiver output by means of a control signal radiated by the transmitter of the substation, when the talking key is pushed.

Consequently, in the two stations, for example by means of a relay, the aerial is connected to the transmitter in the case of outgoing speech and connected to the receiver when the other subscriber talks. A corresponding circuit is also provided in the main station as a substitution of the four-wire termination, the two wires of the line being connected to the modulator input of the transmitter, when the main station transmits speech signals, and connected to the receiver, when the subscriber of the substation talks. The change-over operation is substantially effected by the talking key of the vehicle receiver and the control signal and, on the other hand, by the microphone currents of the operator of the main station via a speech-controlled switch.

The system according to the invention may be realized in such manner that, when the control signal disappears, the speech-modulated switch of the main station is given an operating pulse which makes the transmitter operative and switches-over the aerial from the receiver to the transmitter. Thus in a particularly simple manner it is ensured that the main station is automatically switched from receiving to transmitting, as soon as the subscriber of the substation stops talking and no longer pushes his talking key. This transmission condition of the main station is hereafter maintained for as long as microphone currents are fed to the speech controlled switch.

When the microphone currents being fed to the speech controlled switch do not occur any longer the main station preferably emits a ring back signal which may be brought about indirectly or directly by the speech controlled switch. This ring-back signal, for example an audiofrequency signal of 2.5 kcs./s. is reproduced in the telephone and/or loudspeaker of the vehicle station, thus indicating that the talking partner in the vehicle station is permitted to take over, hence may push his talking key. Consequently a short audio-frequency signal occurs in the handset of the subscriber on the vehicle after the information given by the talking partner is over, and experience has shown that already after a short time the subscriber on the vehicle pushes his talking key quite automatically as soon as he hears this tone.

In the system according to the invention, the main station may be called by the substation in such manner that the control signal switching-over the handset of the main station to the receiver output and also a calling signal is transmitted, which in the main station is supplied to a calling-signal receiver which in the rest condition, instead of the handset, is connected to the output of the receiver, producing there an optical and/or acoustic indication of the incoming call. Consequently, two signals are transmitted for calling, viz.:

(1) The control-signal which makes the main station ready for reception.

(2) A calling signal which in the main station actuates the calling alarm proper.

On the other hand, the substation may be called by the main station in such manner that calling is effected merely by radiation of the carrier-wave frequency speech-modulated with the calling number or the like and reproduction of the call in the substation by a loudspeaker connected to the output of the receiver, since the pronunciation of the calling number actuates the speech-controlled switch which makes the transmitter operative and connects the aerial to the transmitter, so that the call is radiated. In the vehicle station the aerial in the rest condition is connected to the receiver and the receiver output is connected to a loudspeaker connected in parallel with the telephone of the handset, thus the incoming call is readily reproduced.

In the system according to the invention, it is preferred to use for the control signal a frequency located within the transmitted low-frequency band, but outside the frequency band required for the speech transmission, for example a frequency of 9 kcs./s., use being made of the fact that the conventional transmitting and receiving devices can readily transmit a low-frequency band having a considerably larger width than is required for a properly audible reproduction of speech. As is well-known, in the transmission of speech, frequencies higher than about 3 kcs./s. may be cut off without the comprehensibility being affected thereby. The required auxiliary signals in such a radio-telephone equipment may thus without difficulty be provided above the upper limit frequency (3 kcs./s.) and separated from the audio-frequency signals by simple means at the receiving end.

In the preferred embodiment of the system according to the invention, the control signal used has two frequencies located outside the audio-frequency band, of which one, for example 9 kcs./s., switches the two-wire telephone line from the modulator input of the transmitter to the output of the receiver, and the other, that of for example 7 kcs./s., switches the telephone line back to its initial condition, the latter frequency being transmitted for a very short period after the talking key has been released. It is thus ensured that the two-wire telephone line is switched-off from the receiver of the main station a short time before the carrier wave of the vehicle station is switched off and that the noise resulting from the switching-off of the carrier wave cannot reach the handset of the subscriber.

In order that the invention may be readily carried into effect, it will now be described, by way of example, with reference to the accompanying drawing, in which.

Figure 1:
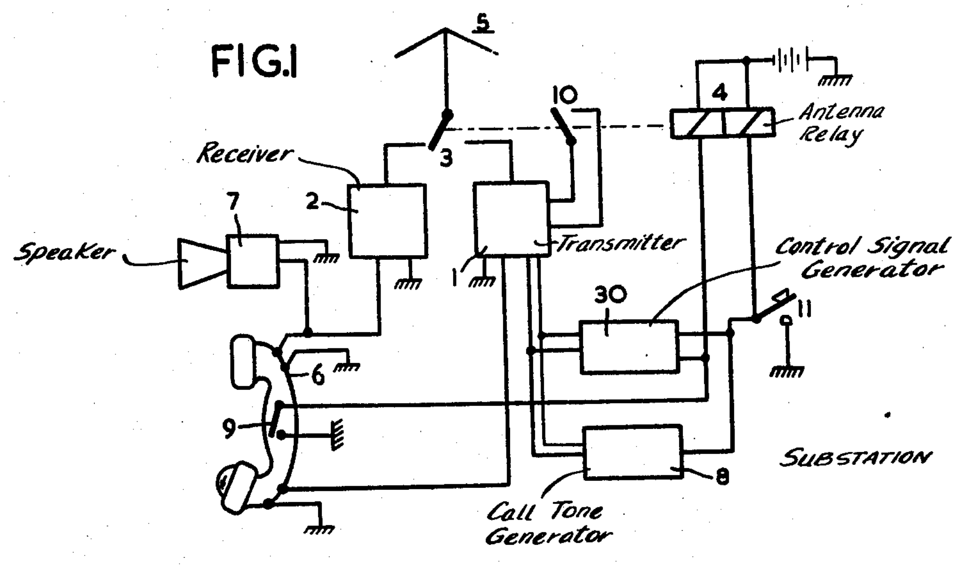
Fig. 1 is a block diagram of a circuit-arrangement of a substation.

Referring to Fig. 1, the substation comprises a transmitter 1 and a receiver 2, which may be connected at will to an aerial 5 via a change-over contact 3 of an aerial relay 4. The receiver output is connected directly to the receiver of a handset 6 and a loudspeaker 7, which is connected in parallel therewith, the transmitter having two modulator inputs. One of these is connected directly to the microphone of the handset, whereas the other may be supplied with the output voltage of a control signal generator 30 and a call-tone generator 8.

In the rest condition of the station, the receiver input is connected to the aerial 5, so that an incoming low-frequency signal, after being amplified and demodulated, is supplied to the telephone or the loudspeaker. The handset 6 has a talking key 9 which, when operated, energizes the aerial relay 4, switching-over the aerial to the transmitter output and at the same time switching the carrier-wave of the transmitter into circuit via a make contact 10. Furthermore, when the talking key 9 is pushed, control-signal generator 30 is made operative, producing a frequency of, for example, 9 kcs./s., which is located outside the audio-frequency band and is modulated on the microphone current provided by the microphone of the handset 9. For the purpose of calling, provision is also made of a call switch 11 which, when operated, makes operative the aerial relay 4 and the control-signal generator 30. At the same time, the call-tone generator 8 is also made operative, which gives a frequency of, for example, 1.8 kcs./s. to the modulator input of the transmitter.

Figure 2:
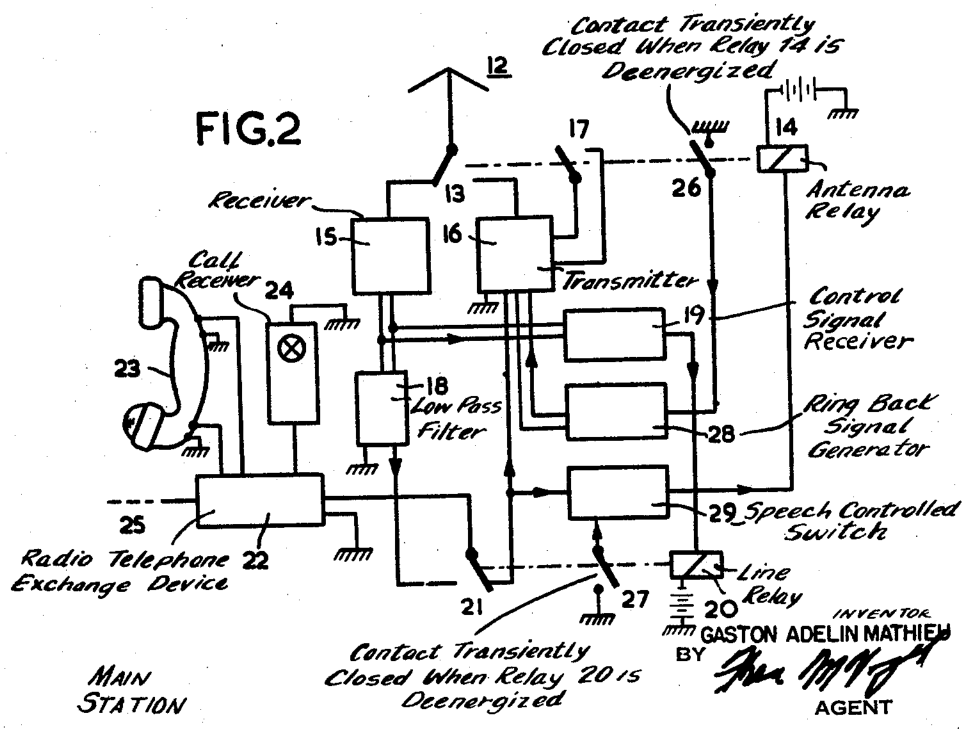
Fig. 2 is likewise a block diagram of a circuit-arrangement of a main station designed for co-operation with the substation of Fig. 1.

In the associated main station shown in Fig. 2, an aerial 12 may likewise be changed-over between the input of a receiver 15 and the output of a transmitter 16 via a change-over contact 13 of an aerial relay 14. The aerial relay 14 likewise has a make contact 17, which makes the transmitter operative when the relay is energized. The output of the receiver is connected, on the one hand, to a low-pass filter 18, which does not pass the control signal and, on the other hand, to a control-signal receiver 19, which energizes a line relay 20 upon reception of the control signal. The output terminals of the low-pass filter 18 are connected via the make side of a change-over contact 21 of line-relay 20 to a radio-telephone exchange device 22, to which are connected a handset 23, a call receiver 24 and, if desired, the telephone system which is represented by a line 25. When relay 20 is energized, the receiver output is thus connected via lowpass filter 18 to the radio-telephone exchange device 22, in which it is connected to the call receiver, the handset or the telephone system in accordance with the instantaneous requirements.

The aerial relay 14 and the line relay 20 each have a contact 26, 27, respectively. These contacts are such as to be transiently closed when the associated relay is de-energized. The contact 26 serves to make operative a ring-back signal generator 28, which supplies a suitable signal voltage to the modulator input of transmitter 16. The rest side of change-over contact 21 is likewise connected to the modulator input of transmitter 16, but is also connected to the input of a speech-controlled switch 29, which serves to energize the aerial relay 14, insofar modulation currents and hence microphone currents flow in the line leading to the transmitter. The speech-controlled switch 29 is also connected to contact 27 of line relay 20, which contact causes a transient operating pulse to be supplied to the speech-modulated switch.

If for the purpose of calling in the substation of Fig. 1 the call switch 11 is closed, the aerial relay 4 is energized, so that the aerial 5 is connected to the output of transmitter 1, which is made operative via change-over contact 10. The call switch 11 also makes operative the control-signal generator 30 and the call-tone generator 8. The transmitter is thus modulated with the frequencies produced by the two said generators, and this so long as the call switch 11 is pushed. In the main station, since this is in the rest condition, the aerial 12 is connected to the receiver 15, so that the two signals radiated by the substation occur across the output of the receiver. The control signal reaches the control-signal receiver 19 and energizes the line relay 20, which switches-over the change-over contact 21, thus connecting the output of the lowpass filter 18 to the radio-telephone exchange device. In the latter, since the main station is in the rest condition, the input is connected to the call receiver 24. The call signal, the frequency of which is located within the audio-frequency band, is passed by the low-pass filter 18 and reaches the call receiver 24 via change-over contact 21 and the radio-telephone exchange device 22. In the call receiver 24 it releases a corresponding alarm, for example due to the signal lamp shown in the figure becoming responsive. The operator of the main station thus observes that a call comes in.

When the call switch 11 in the substation is released after a few seconds, the transmitter 1, the control-signal generator 30 and the call-tone generator 8 are made inoperative. The aerial relay 4 also becomes currentless, so that the aerial 5 is again connected to the input of the receiver. Since in the main station a call signal is then no longer received, the line relay 20 is deenergized and the radio-telephone exchange device is connected to the modulator input of transmitter 16 and the speech-controlled switch 29. Upon de-energization of the line relay 20, an operating pulse is supplied via contact 27 to the speech-controlled switch 29, this making operative the aerial relay 14. Upon energization of the latter, the aerial 12 is connected to the output of the transmitter, the transmitter being made operative via the make contact 17. In the meantime, the operator in the main station has switched on the handset 23 instead of the call receiver, which may be effected, for example, via a conventional jack contact. When he answers the call, the telephone currents find a transmitter which is ready for operation. At the same time, the speech-controlled switch remains in the operative condition, so long as the operator talks. The transmitter thus remains operative and connected to the aerial.

When the operator—or in case of a through-connection the subscriber of the telephone system—stops talking, the aerial relay 14 is deenergized, however, prior to this de-energization the ring back signal generator is transiently made operative through the intermediary of the additional contact 26.

This short signal of about 2500 c./s. is thus received by the subscriber on the vehicle immediately after the last word of the talking partner and serves as an indication that the subscriber on the vehicle can now answer. For this purpose he need only push his talking key 9, whereupon the transmission of the speech modulation to the main station takes place in the manner previously described. Practical experience has shown that after a very short time the subscriber on the vehicle is already accustomed to push his talking key and reply immediately upon the ring-back signal.

Tests with such devices have also shown that interfering noise may still occur in switching-over, that is to say in changing-over from talking to listening. This is the characteristic noise which is inherent more particularly in all ultrashort-wave FM-devices, when the carrier-wave of a station just received is suddenly switched off. Use is frequently made of a squelch circuit which is made operative by the incoming noise and blocks the low-frequency receiver stage. However, such blocking circuits need a certain time of response and thus can remove only in part the interfering noise which occurs with each change of speaker.

In the vehicle station, interfering noise need not necessarily be heard, provided that the talking key 9 is pushed in time, that is to say as soon as the ring back signal of the main station is heard, since the pushing of the talking key 9 results in the telephone 6 and the loudspeaker 7 being switched off just before the interfering noise occurs. In one preferred embodiment of the described system, the interfering noise is likewise avoided in the main station. For this purpose, the device shown in Figs. 1 and 2 may be modified in such manner, that the control-signal generator 30 supplies a control signal of 9 kcs./s. when the talking key 9 is pushed, but is transiently changed-over to another frequency, for example 7 kcs./s., when the talking key is released, and that the aerial relay 4 is of the type which is deenergized with retardation.

For transient switching-over to another frequency, use is preferably made of a relay circuit having relays of the type which is de-energized without retardation and with retardation, respectively.

In the main station the control-signal receiver 19 is so designed that, when the control-signal of 9 kcs./s. is received, the line relay 20 becomes responsive and keeps closed until the 7 kcs./s. control-signal is received. The latter signal only causes de-energization of the relay 20. In this way the radio-telephone exchange device 22 is separated from the receiver 15 a short time before the carrier-wave of the substation is switched off due to the change-over contact 21 returning to its rest-position, so that noise produced in the main station receiver when the carrier-wave of the mobile transmitter is switched off, is not heard.

What is claimed is:

1. A radio communication system comprising a main station and a substation, each of said stations comprising a receiver, a transmitter for producing a communication signal modulated on a carrier wave having the same frequency for all of said stations, an antenna, and means normally connecting said antenna to the input of said receiver, said substation further comprising means to switch the subtation antenna to the output of the substation transmitter when it is desired to transmit from said substation and means to transmit a control signal along with the substation communication signal, said main station further comprising a speech-actuated means for connecting the main station antenna to the main station output of the transmitter when it is desired to transmit from said main station, said main station further comprising a microphone and speaker arrangement, said microphone being normally connected to the modulator input of the main station transmitter, and said main station further comprising means responsive to said control signal for disconnecting said microphone from the main station transmitter and connecting said speaker to the output of the main station receiver.

2. A system as claimed in claim 1, in which said main station further comprises means connected to produce an operating pulse upon cessation of said control signal, and means responsive to said operating pulse for connecting the main station antenna to the main station transmitter.

References Cited in the file of this patent

UNITED STATES PATENTS

| | | |
|---|---|---|
| 1,298,613 | White | Mar. 25, 1919 |
| 1,904,567 | Taylor | Apr. 18, 1933 |
| 1,945,082 | Sandeman et al. | Jan. 30, 1934 |
| 2,206,231 | MacKay | July 2, 1940 |
| 2,495,452 | Grove | Jan. 24, 1950 |
| 2,671,166 | O'Brien | Mar. 2, 1954 |